US012789733B2

(12) United States Patent
Arita

(10) Patent No.: US 12,789,733 B2
(45) Date of Patent: Nov. 10, 2026

(54) VEHICLE STRUCTURE

(71) Applicant: TOYOTA JIDOSHA KABUSHIKI KAISHA, Toyota (JP)

(72) Inventor: Kosuke Arita, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 395 days.

(21) Appl. No.: 18/515,277

(22) Filed: Nov. 21, 2023

(65) Prior Publication Data

US 2024/0239285 A1 Jul. 18, 2024

(30) Foreign Application Priority Data

Jan. 17, 2023 (JP) ................................ 2023-005473

(51) Int. Cl.
*B60R 19/24* (2006.01)

(52) U.S. Cl.
CPC .................................... *B60R 19/24* (2013.01)

(58) Field of Classification Search
CPC ....... B60R 19/24; B60R 19/18; B60R 19/023; B60R 19/34; B60R 2019/247; B60R 2019/1806; B60R 2019/242; B60R 2021/0023; B62D 21/152; B62D 21/155
USPC ...... 296/187.1; 293/155, 132, 154, 102, 133
See application file for complete search history.

(56) References Cited

U.S. PATENT DOCUMENTS

2014/0361560 A1* 12/2014 Sakakibara .......... B62D 21/152 293/133
2015/0314742 A1* 11/2015 Kato ....................... B60R 19/34 293/155
2016/0167712 A1* 6/2016 Ogawa ................... B62D 25/08 296/187.1
2016/0264178 A1* 9/2016 Ito ......................... B62D 21/152
2017/0036699 A1* 2/2017 Asai ...................... B62D 25/082
2018/0244225 A1* 8/2018 Nakayama .............. B60R 19/24
2021/0347413 A1* 11/2021 Park ...................... B62D 21/152
2023/0373563 A1* 11/2023 Rai ....................... B62D 21/152

FOREIGN PATENT DOCUMENTS

JP 2015-137082 A 7/2015
WO 2022/031991 A1 2/2022

* cited by examiner

*Primary Examiner* — Wenwei Zhuo
(74) *Attorney, Agent, or Firm* — SOLARIS Intellectual Property Group, PLLC

(57) ABSTRACT

A vehicle structure that includes: a first engagement portion that is formed at an end portion of a bumper reinforcement; and a second engagement portion that is provided at a side member and that engages with the first engagement portion, wherein, the first engagement portion and the second engagement portion engage with each other in both directions of a plan view and a side view of a vehicle.

2 Claims, 6 Drawing Sheets

VEHICLE STRUCTURE

CROSS-REFERENCE TO RELATED APPLICATION

This application is based on and claims priority under 35 USC 119 from Japanese Patent Application No. 2023-005473, filed on Jan. 17, 2023, the disclosure of which is incorporated by reference herein.

BACKGROUND

Technical Field

The present disclosure relates to a vehicle structure.

Related Art

Japanese Patent Application Laid-Open (JP-A) No. 2015-137082 discloses a structure, in a vehicle body front portion structure of a vehicle in which a gusset extends from a front side frame with the gusset expanding in diameter in a vehicle width direction toward the front, wherein a gap portion is provided between a rear surface of a bumper reinforcement and a front end surface of the gusset, and a regulating means is provided to regulate a relative position of the front end surface of the gusset with respect to the rear surface of the bumper reinforcement within a preset region. For example, in a vehicle including a gusset, such as in the vehicle body front portion structure described in aforementioned JP-A No. 2015-137082, the gusset functions as a load receiving member at a time of a micro-lap collision in which an obstacle collides only with an end portion of the vehicle in a vehicle width direction.

Meanwhile, at the time of a front collision such as a micro-lap collision or the like, it is desired that a front side member extending in a vehicle front-rear direction compresses in an axial direction to receive a collision load. In the vehicle body front portion structure described in JP-A No. 2015-137082, a collision load input from the bumper reinforcement is transmitted to the front side member via the gusset. However, at the time of a front collision, there are cases in which the front side member cannot adequately transmit a collision load due to displacement of a contact position between the gusset and the front side member, and there is room for improvement with regard to load transmission.

SUMMARY

An aspect of the present disclosure is a vehicle structure that includes: a first engagement portion that is formed at an end portion of a bumper reinforcement; and a second engagement portion that is provided at a side member and that engages with the first engagement portion, wherein, the first engagement portion and the second engagement portion engage with each other in both directions of a plan view and a side view of a vehicle.

DETAILED DESCRIPTION

Figure 1:
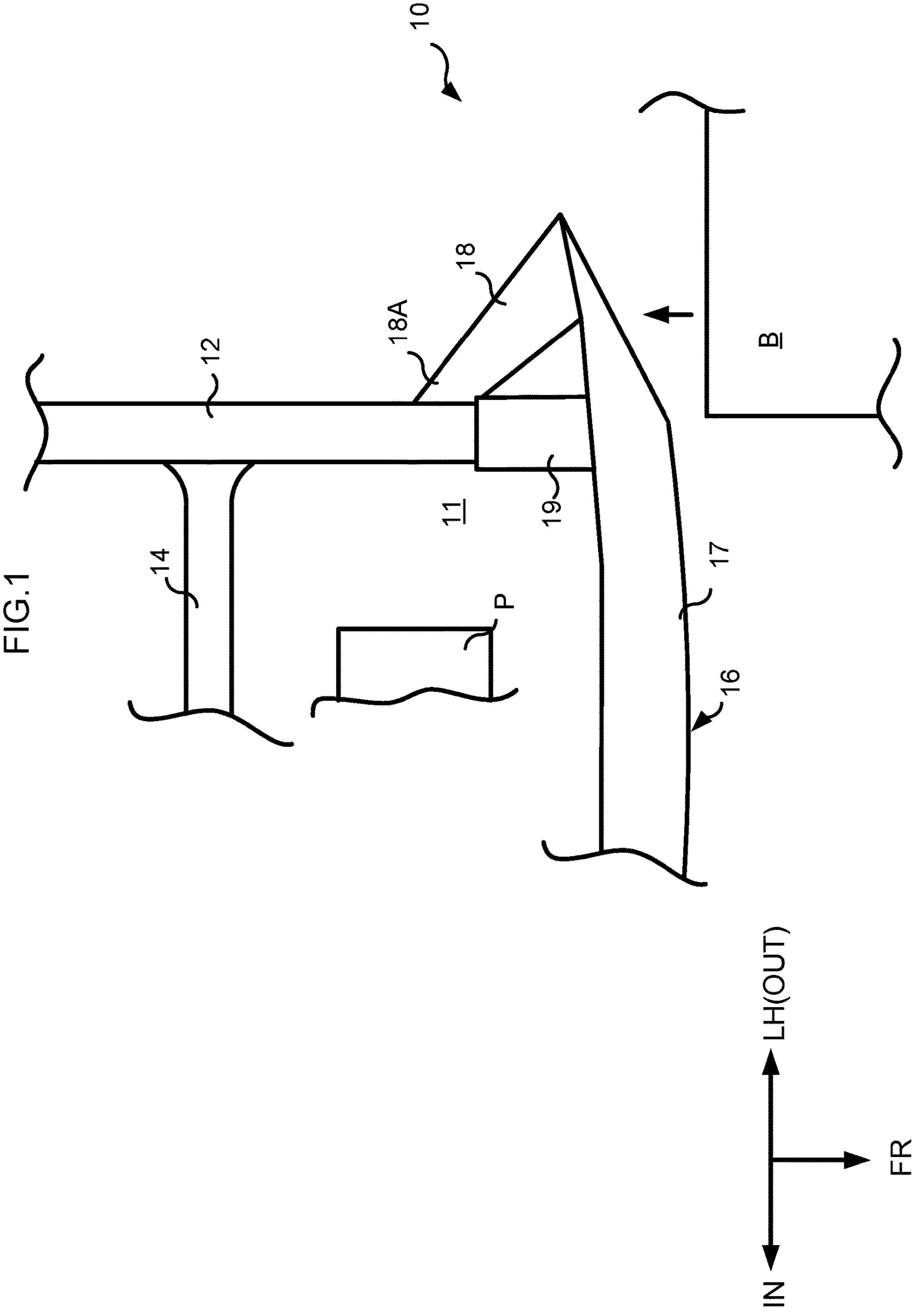
FIG. 1 is a plan view schematically illustrating an example of a main portion of a vehicle front portion including a vehicle structure according to an exemplary embodiment of the present disclosure.

Explanation follows regarding a vehicle front portion structure serving as a vehicle structure according to an exemplary embodiment of the present disclosure, with reference to the drawings. It should be noted that, since the vehicle front portion structure is a bilaterally symmetrical structure, only a portion at a left side is illustrated in the drawings, and description of a portion at a right side is omitted. Further, arrow FR appropriately illustrated in the respective drawings indicates a front side in a vehicle front-rear direction, and arrow UP indicates an upper side in a vehicle up-down direction. Furthermore, arrow LH indicates a left side in a vehicle width direction, and indicates a vehicle width direction outer side in the present exemplary embodiment. It should be noted that, since explanation is given regarding only the portion at the left side in the present exemplary embodiment, the explanation is given by defining the vehicle left side as the vehicle width direction outer side and defining a vehicle width direction right side as a vehicle width direction central side. In the following, in cases in which explanation is given simply using front-rear, up-down, and left-right directions, this is presumed to indicate front and rear in the vehicle front-rear direction, up and down in the vehicle up-down direction, and left and right in the vehicle left-right direction (vehicle width direction), unless otherwise specified. Further, for example, as in the case in which the configuration of the present exemplary embodiment is a bilaterally symmetrical configuration, the present disclosure can be applied even in a configuration in which a vehicle width direction right side is defined as the vehicle width direction outer side, and a vehicle left side is defined as the vehicle width direction central side.

Configuration of Vehicle Front Portion Structure

First, explanation follows regarding a configuration of a vehicle front portion structure 10 according to the present exemplary embodiment. As illustrated in FIG. 1, in the present exemplary embodiment, the vehicle front portion structure 10 is incorporated into an electrically driven vehicle, such as an electric vehicle, a fuel cell vehicle or the like, that travels by power generated at a power unit P, as an example. A power unit chamber 11 in which the power unit P is installed is provided at a vehicle front portion.

The vehicle front portion structure 10 includes front side members 12 that are side frame members of the vehicle, that are disposed at both vehicle width direction sides of the vehicle front portion, and that extend in the front-rear direction, and a cross member 14 that extends in the vehicle width direction and connects the left and right front side members 12 together. The front side member 12 and the cross member 14 are made of steel, for example, and the front side member 12 has a hollow substantially rectangular cross-sectional shape. In the present exemplary embodiment, as an example, the front side member 12 is integrally formed by die casting.

The vehicle front portion structure 10 includes a bumper reinforcement 16 (hereafter referred to as a "bumper RF") that is at a front end side of the front side members 12 and that extends in the vehicle width direction at a front end of the power unit chamber 11. The bumper RF 16 is a member that receives a collision load at a time of a vehicle collision, and transmits the received collision load toward the vehicle rear side. The bumper RF 16 includes a central portion 17 that has a hollow substantially rectangle cross-sectional shape and that is positioned at the front end of each of the left and right front side members 12, and bumper RF spacers 18 that extend to the vehicle inner side from both left and right end portions of the central portion 17 toward the rear of the vehicle.

The central portion 17 of the bumper RF 16 has a bent or curved shape that is convex toward the front, and both left and right end portions thereof extend toward the vehicle rear side at vehicle width direction outer sides of the left and right front side members 12. The left and right front side members 12 are connected to both vehicle width direction ends of the central portion 17 via crash boxes 19 serving as energy absorbing members.

The crash box 19 is configured so as to deform before the front side member 12 deforms and to absorb a portion of the energy of the collision, when the vehicle undergoes a front collision. When a impact load is transmitted from the bumper RF 16 to the crash box 19, the crash box 19 is compressed in the front-rear direction.

It should be noted that front collisions include symmetric collisions (full lap collisions) in which an entire front surface of the vehicle collides, and asymmetric collisions (offset collisions) in which one side of the front surface of the vehicle collides. In the present exemplary embodiment, among offset collisions, a case in which a portion of the vehicle front portion that is at a vehicle width direction outer side of the front side member 12 collides with a collision body B such as another vehicle or the like (refer to FIG. 1) is referred to as a micro-lap collision.

The bumper RF spacers 18 extend to the vehicle inner side from both left and right end portions of the central portion 17 toward the rear of the vehicle, and distal end portions 18A thereof are connected to the front side members 12. It should be noted that the distal end portions 18A corresponds to end portions of the bumper RF 16. Here, explanation follows regarding a connection structure between the distal end portion 18A of the bumper RF spacer 18 and the front side member 12.

Figure 2:
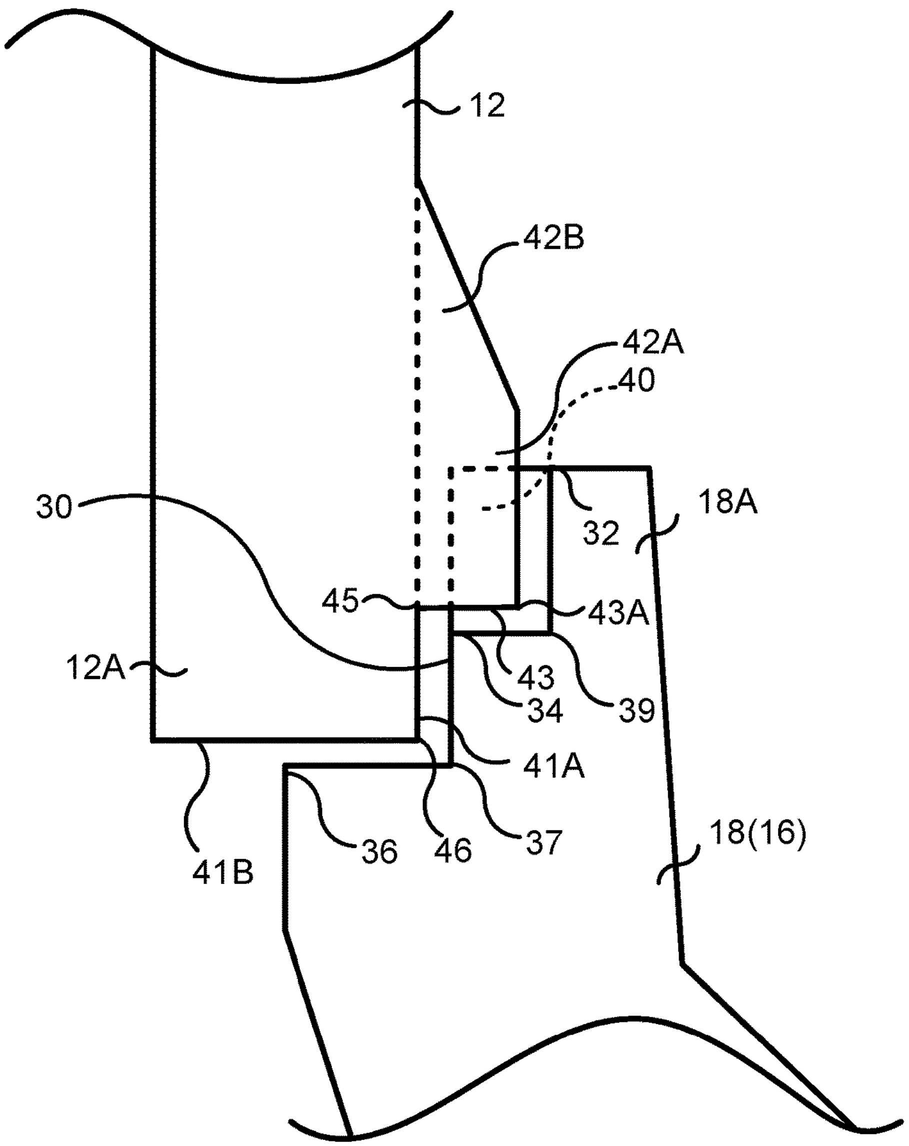
FIG. 2 is a plan view illustrating an example of a schematic configuration of a front end portion of a front side member and a left end portion of a bumper reinforcement.
Figure 2:
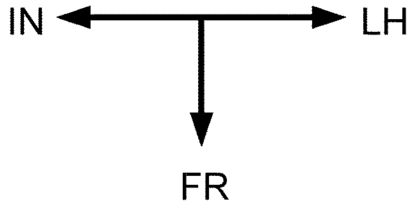

As illustrated in FIG. 2, a first engagement portion 30 is formed at a distal end portion of the bumper RF 16. Further, a second engagement portion 40 is formed at a front end portion 12A of the front side member 12. The first engagement portion 30 and the second engagement portion 40 are configured so as to engage with each other in both a plan view (refer to FIG. 2) and a side view of the vehicle.

Figure 3:
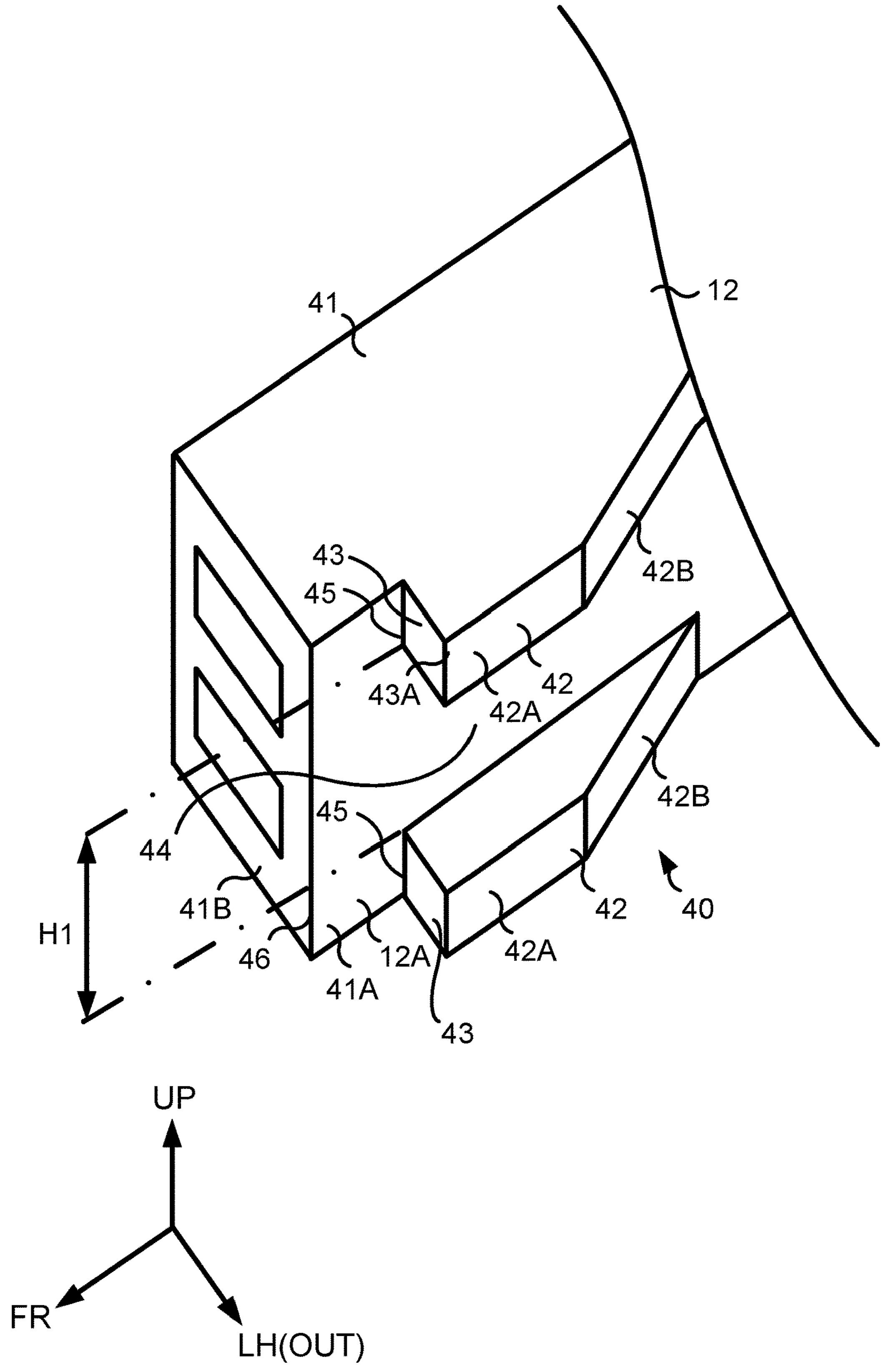
FIG. 3 is a perspective view illustrating an example of a schematic configuration of the front end portion of the front side member.

As illustrated in FIG. 2 and FIG. 3, in more detail, the front end portion 12A of the front side member 12 of the present exemplary embodiment includes an elongated main body member 41 having a non-rounded "8"-shaped cross-section. A vehicle outer side surface 41A of the main body member 41 is provided with projecting portions 42 respectively provided at both end portions in the up-down direction so as to project toward the vehicle outer side.

Each projecting portion 42 includes a rectangular parallelepiped portion 42A formed in a rectangular parallelepiped shape at a vehicle front side thereof, and an oblique portion 42B extending from a rear end of the rectangular parallelepiped portion 42A toward the vehicle outer side surface 41A at the vehicle direction side. In the present exemplary embodiment, a concave portion 44 is configured by an inner side surface, in the up-down direction, of each of the projecting portions 42 respectively provided above and below, and the vehicle outer side surface 41A, and this concave portion 44 functions as the second engagement portion 40. It should be noted that the concave portion 44 is configured so as to have a height H1 between the inner side surfaces, in the up-down direction, of the projecting portions 42 respectively provided above and below.

Further, a first step portion 45 formed by the vehicle outer side surface 41A and a front surface 43 of the rectangular parallelepiped portion 42A, and a second step portion 46 formed by a front surface 41B of the main body member 41 and the vehicle outer side surface 41A also function as the second engagement portion 40. Furthermore, a front corner portion 43A of the rectangular parallelepiped portion 42A also serves as the second engagement portion 40.

Further, as illustrated in FIG. 2, the distal end portion of the bumper RF 16 of the present exemplary embodiment, namely, the distal end portion 18A of the bumper RF spacer 18, includes a first shoulder portion 32, a second shoulder portion 34, and a third shoulder portion 36 formed in a stepped shape from the vehicle rear side to the vehicle front side. In the present exemplary embodiment, the second shoulder portion 34 is formed at a position at which it engages with the first step portion 45 of the front side member 12.

Further, a first boundary portion 37 between the second shoulder portion 34 and the third shoulder portion 36 is formed at a position at which it engages with the second step portion 46 of the front side member 12. Furthermore, a second boundary portion 39 between the first shoulder portion 32 and the second shoulder portion 34 is formed at a position at which it engages with the front corner portion 43A of the rectangular parallelepiped portion 42A of the front side member 12. In the present exemplary embodiment, the second shoulder portion 34, the first boundary portion 37, and the second boundary portion 39 function as the first engagement portion 30.

Figure 4:
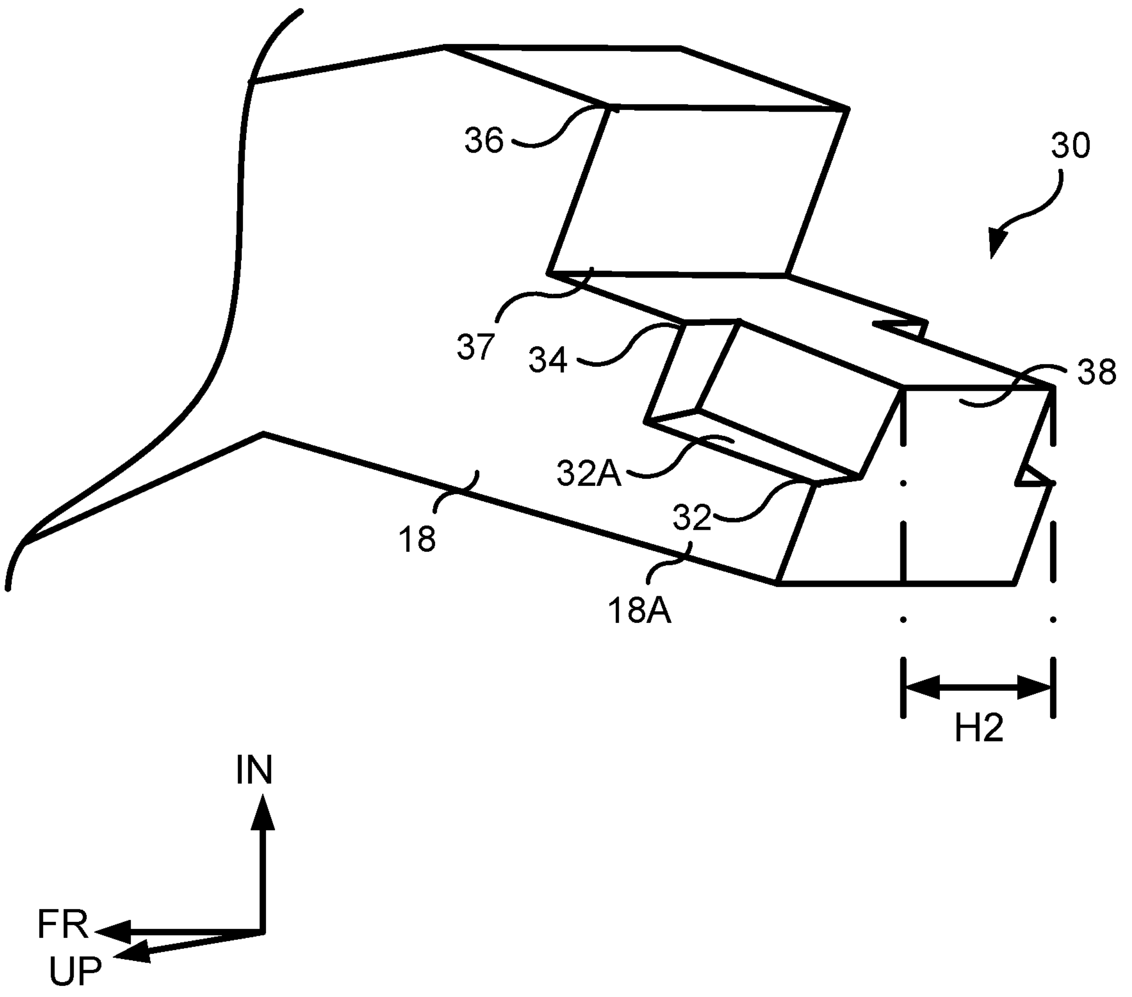
FIG. 4 is a perspective view illustrating an example of a schematic configuration of the left end portion of the bumper reinforcement.

Further, as illustrated in FIG. 4, at a rear end of a vehicle inner side surface 32A at which the first shoulder portion 32 is formed, a convex portion 38, which projects as a rectangular parallelepiped at substantially a center in the up-down direction, is formed. This convex portion 38 is formed in a prism shape when viewed alone, and this convex portion 38 functions as the first engagement portion 30. Furthermore, a front end side of the convex portion 38 is connected to the second shoulder portion 34. The convex portion 38 is formed so as to have a height H2 in the vehicle up-down direction. The height H2 of the convex portion 38 is formed so as to be slightly smaller than the height H1 of the concave portion 44, so as to provide play in order for the convex portion 38 to engage with the concave portion 44 of the front side member 12 described above.

Operation and Effects

Next, explanation follows regarding operation and effects of the present exemplary embodiment.

The vehicle front portion structure 10 serving as the vehicle structure according to the present exemplary embodiment includes the first engagement portion 30 that is formed at the bumper RF spacer 18 serving as the end portion of the bumper RF 16, and the second engagement portion 40 that is provided at the front end portion 12A of the front side member 12 and that engages with the first engagement portion 30. The first engagement portion 30 and the second engagement portion 40 engage with each other in both directions of a plan view and a side view of the vehicle.

In more detail, as illustrated in FIG. 2, in a plan view, the first engagement portion 30 includes plural shoulder portions, namely, the first shoulder portion 32, the second shoulder portion 34, and the third shoulder portion 36, in a stepped shape. Further, the second engagement portion 40 includes the first step portion 45 that engages with the second shoulder portion 34. Consequently the second shoulder portion 34 and the first step portion 45 engage with each other. Further, the front corner portion 43A of the rectangular parallelepiped portion 42A and the second step portion 46 serving as the first engagement portion 30 engage with the second boundary portion 39 and the first boundary portion 37 serving as the second engagement portion 40, respectively.

As described above, in the present exemplary embodiment, the stepped portions can be made to engage with the shoulder portions having the stepped shape in plan view, and therefore, the distal end portion 18A of the bumper RF spacer 18, serving as the end portion of the bumper RF 16, and the front side member 12 can be made to engage more firmly.

Further, as illustrated in FIG. 2 and FIG. 4, the distal end portion 18A of the bumper RF spacer 18 includes the convex portion 38 serving as the first engagement portion 30. Furthermore, as illustrated in FIG. 2 and FIG. 3, the front end portion 12A of the front side member 12 includes the concave portion 44 serving as the second engagement portion 40. Consequently, by fitting the convex portion 38 into the concave portion 44 in the side view, the bumper RF spacer 18 of the bumper RF 16 and the front side member 12 can be made to firmly engage with each other in the vehicle up-down direction.

As described above, due to the first engagement portion 30 and the second engagement portion 40 engaging with each other in both directions of a plan view and a side view of the vehicle, the bumper RF spacer 18 of the bumper RF 16 and the front side member 12 can be made to more firmly engage with each other, compared with a case in which the first engagement portion 30 and the second engagement portion 40 engage with each other only in either one of a plan view or a side view of the vehicle. Consequently, a load can be transmitted to the front side member 12 regardless of the direction in which the load is applied at the time of a collision, and particularly at the time of a micro-lap collision, and therefore, the transmission ability of the load to the front side member 12 at the time of a collision can be improved.

Further, in the vehicle front portion structure 10 according to the present exemplary embodiment, due to the front side member 12 being integrally formed by die casting, the shape thereof can be designed more finely, and therefore, the degree of freedom for design can be improved. Furthermore, by devising the shapes of the first engagement portion 30 and the second engagement portion 40, the bumper RF spacer 18 of the bumper RF 16 and the front side member 12 can be made to engage with each other more firmly.

It should be noted that, in the above exemplary embodiment, although the first engagement portion 30 and the second engagement portion 40 are configured to engage with each other in a side view by the concave portion 44 and the convex portion 38, namely by a single concavo-convex shape, the present exemplary embodiment is not limited thereto.

Modified Examples

Figure 5:
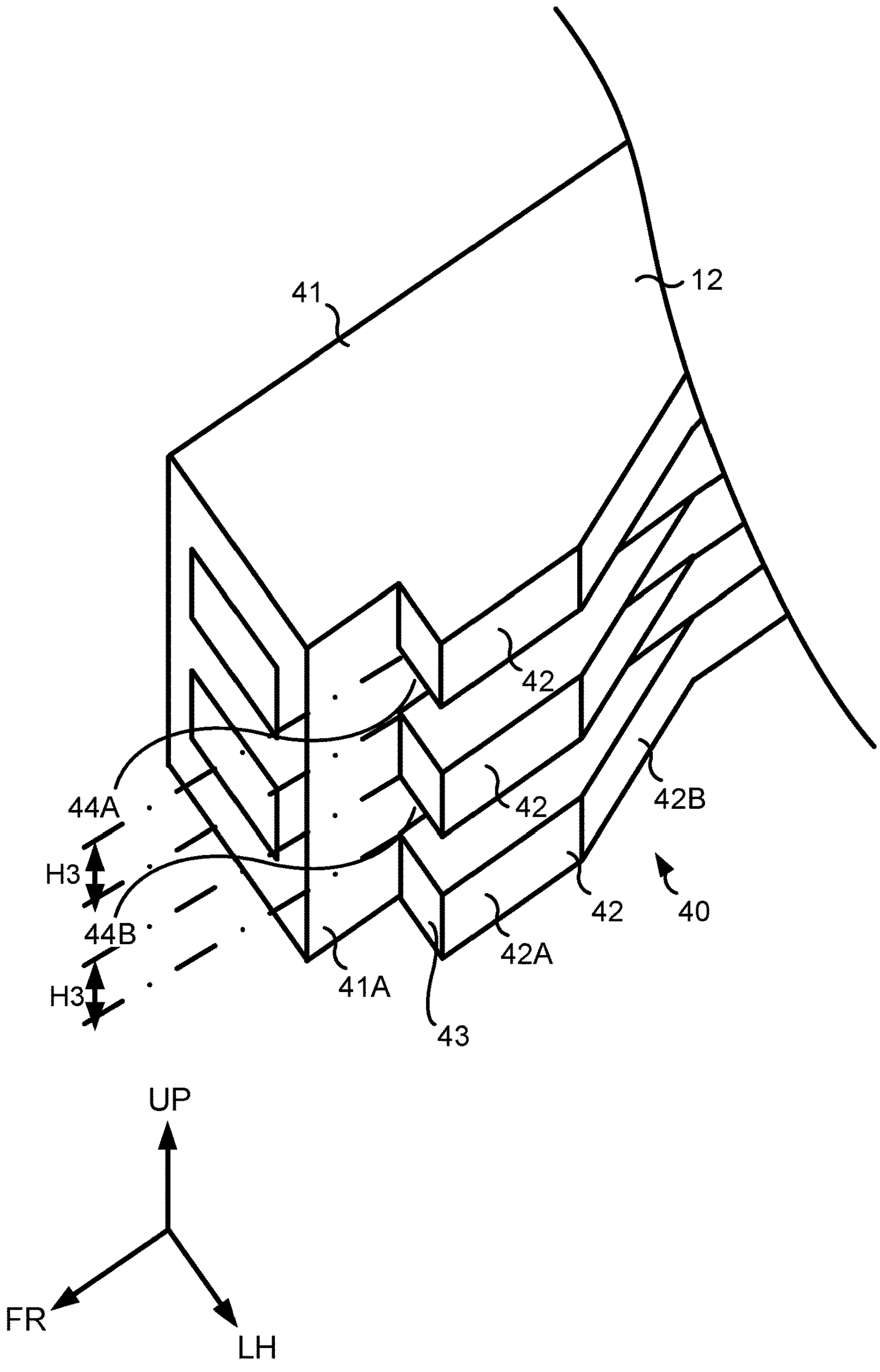
FIG. 5 is a perspective view illustrating another example of a schematic configuration of the front end portion of the front side member.

As illustrated in FIG. 5, in a modified example, the front end portion 12A of the front side member 12 includes a first concave portion 44A and a second concave portion 44B serving as the second engagement portion 40. In more detail, although the two projecting portions 42 are provided at the front end portion 12A of the front side member 12 in the above exemplary embodiment, in this modified example, three projecting portions 42 are provided so as to project, which are aligned in the up-down direction. It should be noted that there may be cases in which redundant reference numerals are omitted in FIG. 5.

In this modified example, the first concave portion 44A and the second concave portion 44B are configured so as to have a height H3 between inner side surfaces, in the vertical direction, of the projecting portions 42 respectively provided adjacent to each other in the up-down direction.

Figure 6:
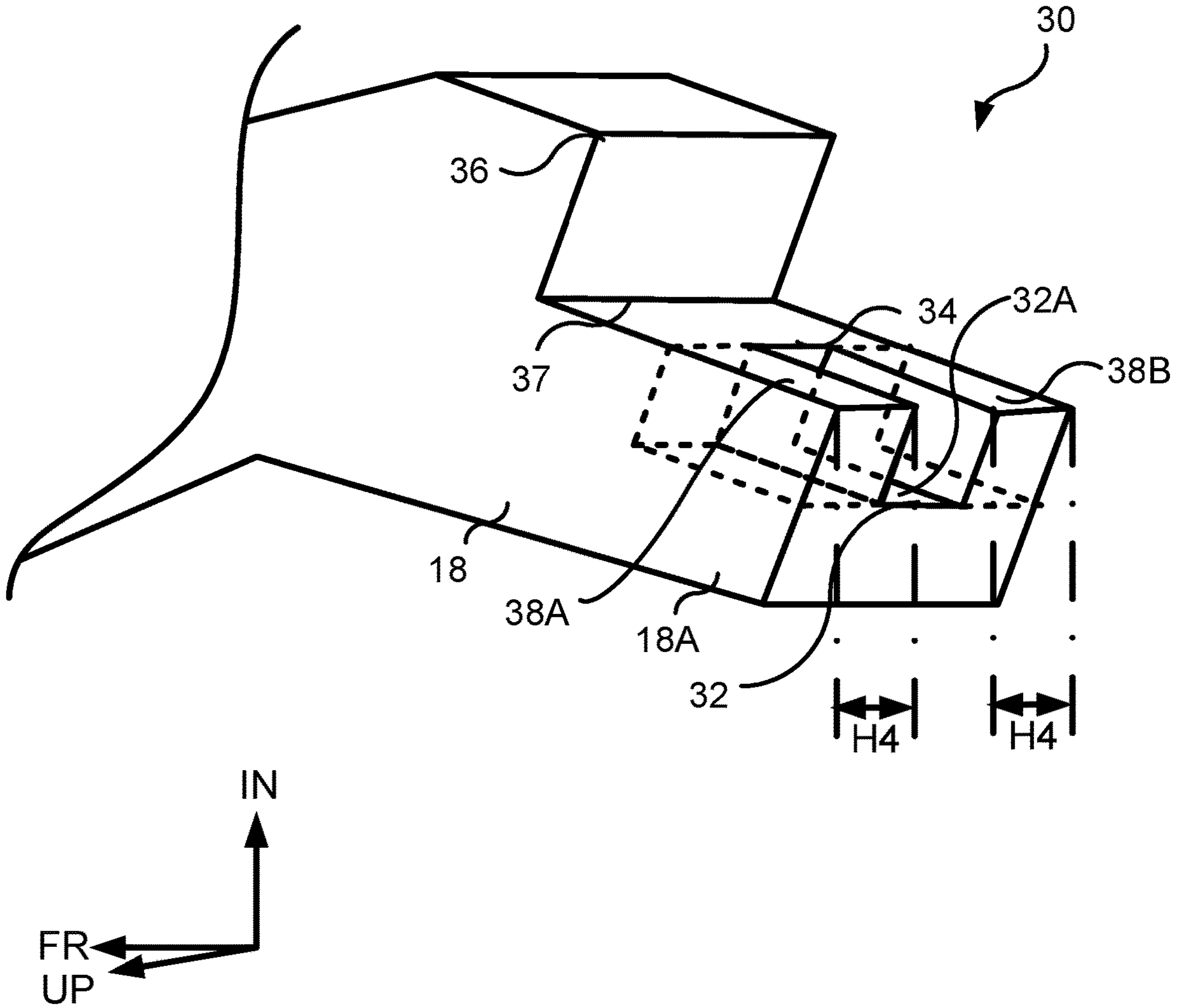
FIG. 6 is a perspective view illustrating another example of a schematic configuration of the left end portion of the bumper reinforcement.

Further, as illustrated in FIG. 6, in a modified example, at the distal end portion 18A of the bumper RF spacer 18, a first convex portion 38A and a second convex portion 38B serving as the first engagement portion 30 and provided so as to project as rectangular parallelepipeds are formed at both end portions in the up-down direction. Namely, while there was one convex portion 38 in the above exemplary embodiment, two convex portions 38A and 38B are formed.

In this modified example, as described above, the first convex portion 38A and the second convex portion 38B serving as the first engagement portion 30 are provided at the distal end portion 18A of the bumper RF spacer 18, and the first concave portion 44A and the second concave portion 44B serving as the second engagement portion 40 are provided at the front end portion 12A of the front side member 12. Consequently, due to the first convex portion 38A and the second convex portion 38B being respectively fit into the first concave portion 44A and the second concave portion 44B in a side view, the bumper RF spacer 18 of the bumper RF 16 and the front side member 12 can be made to be firmly engaged in the vehicle up-down direction.

It should be noted that, although a structure is provided in the exemplary embodiment described above in which the first engagement portion 30 has plural shoulder portions in a stepped shape and the second engagement portion 40 has a stepped portion that engages with at least a portion of the plural shoulder portions of the first engagement portion 30 in a plan view, the present disclosure is not limited thereto. For example, a structure may be adopted in which concavo-convex shapes also engage with each other in a plan view. Further, the structure of the first engagement portion 30 may be formed at the front side member 12, and the structure of the second engagement portion 40 may be formed at the distal end portion 18A of the bumper RF spacer 18.

Further, although the front side member 12 is integrally formed by die casting in the exemplary embodiment described above, the present disclosure is not limited thereto, and the front side member 12 may be formed as separate bodies or may be formed by a known technique other than die casting.

Further, although the vehicle front portion structure 10 has been explained as the vehicle structure in the exemplary embodiment described above, the present disclosure is not limited thereto. For example, the present disclosure may be applied to a vehicle rear portion structure as the vehicle structure. In this case, as an example, the first engagement portion 30 is formed at an end portion of a rear bumper reinforcement, and the second engagement portion 40 is formed at a rear side member. Consequently, the same advantageous effects as those of the above exemplary embodiment can also be obtained in a vehicle rear portion.

Although explanation has been given above regarding an exemplary embodiment of the present disclosure, the present disclosure is not limited to the above exemplary embodiment. Various modified examples may be appropriately used in combination with the exemplary embodiment, and various modes may be implemented within a range that does not depart from the spirit of the present disclosure.

An object of the present disclosure is to obtain a vehicle structure that is capable of improving a transmission ability of a load to a side member at a time of a collision.

A first aspect of the present disclosure is a vehicle structure that includes: a first engagement portion that is formed at an end portion of a bumper reinforcement; and a second engagement portion that is provided at a side member and that engages with the first engagement portion, wherein, the first engagement portion and the second engagement portion engage with each other in both directions of a plan view and a side view of a vehicle.

In the vehicle structure of the first aspect of the present disclosure, the first engagement portion that is formed at the end portion of the bumper reinforcement and the second engagement portion that is provided at the side member and that engages with the first engagement portion engage with each other in both directions of the plan view and the side view of the vehicle. Consequently, the end portion of the bumper reinforcement and the side member can be made to engage more firmly with each other as compared with a case in which the first engagement portion and the second engagement portion engage with each other only in either one of a plan view or a side view of the vehicle. As a result, a load can be transmitted to the side member regardless of a direction from which the load is applied at a time of a collision, and therefore, a transmission ability of the load to the side member at the time of a collision can be improved.

A second aspect of the present disclosure is the vehicle structure of the first aspect, wherein the first engagement portion and the second engagement portion engage with each other by concavo-convex shapes.

In the vehicle structure of the second aspect of the present disclosure, the first engagement portion and the second engagement portion engage with each other by concavo-convex shapes. Consequently, due to a concave shape and a convex shape engaging with each other, the end portion of the bumper reinforcement and the side member can be made to firmly engage with each other.

A third aspect of the present disclosure is the vehicle structure of the first aspect, wherein, in the plan view, the first engagement portion has a plurality of shoulder portions in a stepped shape, and the second engagement portion has a stepped portion that engages with at least a portion of the plurality of shoulder portions.

In the vehicle structure of the third aspect of the present disclosure, in the plan view, the first engagement portion has the plural shoulder portions in a stepped shape, and the second engagement portion has the stepped portion that engages with at least a portion of the plural shoulder portions. Consequently, the stepped portion can be made to engage with the shoulder portions having the stepped shape, and therefore, the end portion of the bumper reinforcement and the side member can be made to engage with each other more firmly.

A fourth aspect of the present disclosure is the vehicle structure of the first aspect, wherein, in the side view, the first engagement portion is formed in a prism shape, and the second engagement portion is formed in a concave shape.

In the vehicle structure of the fourth aspect of the present disclosure, in the side view, the first engagement portion is formed in a prism shape, and the second engagement portion is formed in a concave shape. Consequently, due to the prism being fit into the concave portion, the end portion of the bumper reinforcement and the side member can be made to firmly engage with each other.

A fifth aspect of the present disclosure is the vehicle structure of the first aspect, wherein the side member is integrally formed by die casting.

In the vehicle structure of the fifth aspect of the present disclosure, due to the side member being integrally formed by die casting, the shape thereof can be designed more finely, and therefore, the degree of freedom for design is improved. Further, by devising the shapes of the first engagement portion and the second engagement portion, the end portion of the bumper reinforcement and the side member can be made to engage with each other more firmly.

The vehicle structure according to the present disclosure is capable of improving a transmission ability of a load to a side member at the time of a collision.

What is claimed is:

1. A vehicle structure comprising:

a first engagement portion that is formed at an end portion of a bumper reinforcement; and a second engagement portion that is provided at a side member and that engages with the first engagement portion, wherein:

in plan view, the first engagement portion has a plurality of shoulder portions in a stepped shape, and the second engagement portion has a stepped portion that engages with at least a portion of the plurality of shoulder portions, in a side view, the second engagement portion includes three projecting portions aligned in an up-down direction, and a first concave portion and a second concave portion respectively formed between the projecting portions adjacent to each other in the up-down direction, and the first engagement portion includes a first convex portion and a second convex portion provided so as to project as rectangular parallelepipeds at both end portions in the up-down direction, and the first engagement portion and the second engagement portion engage with each other in both directions of the plan view and the side view of a vehicle, such that the stepped portion engages with the at least a portion of the plurality of shoulder portions in the plan view, and the first convex portion and the second convex portion are respectively fit into the first concave portion and the second concave portion in the side view.

2. The vehicle structure according to claim 1, wherein the side member is integrally formed by die casting.

* * * * *